July 24, 1951
H. E. TEMPLE
2,561,542
CONTINUOUSLY OPERATING VARIABLE SPEED
LOADING MECHANISM FOR BAKING OVENS
Filed Nov. 5, 1945
5 Sheets-Sheet 1
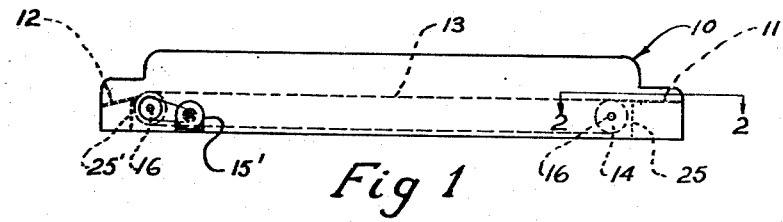
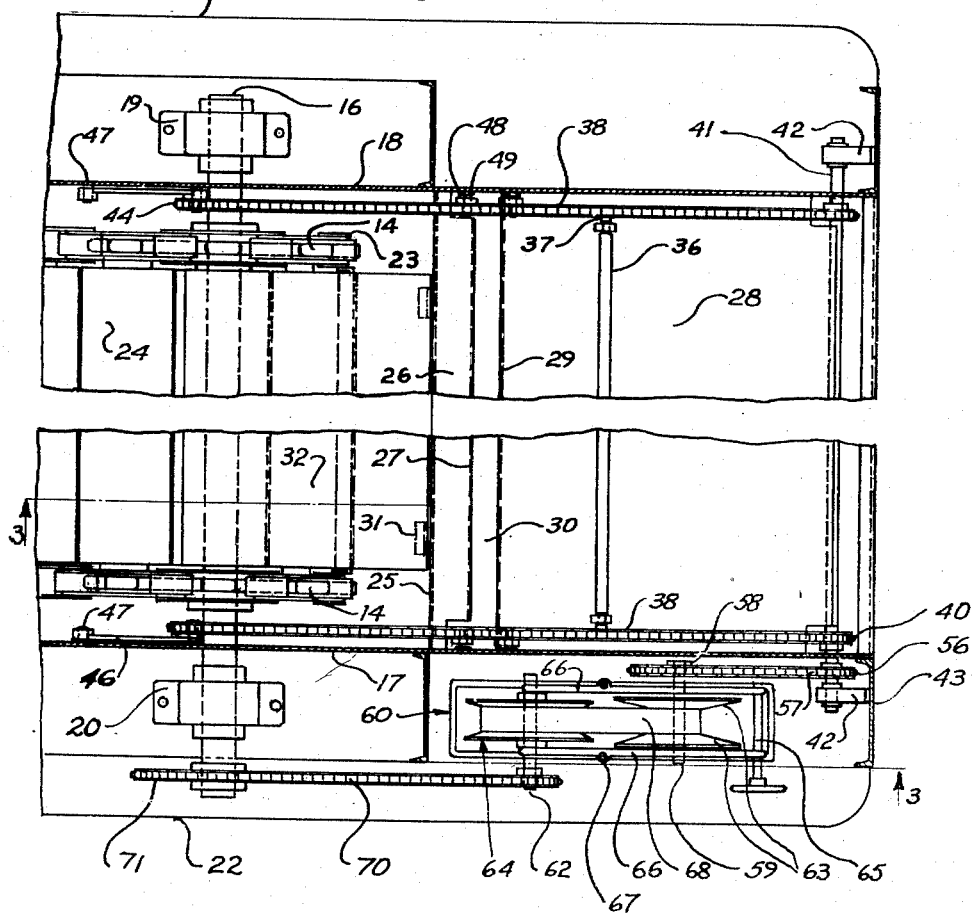
INVENTOR.
HIRAM E TEMPLE
BY James M. Abbett
ATTY.

July 24, 1951

H. E. TEMPLE 2,561,542

CONTINUOUSLY OPERATING VARIABLE SPEED
LOADING MECHANISM FOR BAKING OVENS

Filed Nov. 5, 1945

INVENTOR.
HIRAM E. TEMPLE

BY James M. Abbott

ATTY

July 24, 1951  H. E. TEMPLE  2,561,542
CONTINUOUSLY OPERATING VARIABLE SPEED
LOADING MECHANISM FOR BAKING OVENS
Filed Nov. 5, 1945  5 Sheets-Sheet 5

INVENTOR.
HIRAM E. TEMPLE
BY
James M. Abbott
ATTY.

Patented July 24, 1951

2,561,542

UNITED STATES PATENT OFFICE 2,561,542

CONTINUOUSLY OPERATING VARIABLE SPEED LOADING MECHANISM FOR BAKING OVENS

Hiram E. Temple, Los Angeles, Calif., assignor, by mesne assignments, to Read Standard Corporation, a corporation of Delaware Application November 5, 1945, Serial No. 626,650

12 Claims. (Cl. 214—18)

This invention relates to baking ovens of the continuous conveyor type, and particularly pertains to a continuously operating variable speed loading mechanism for baking ovens.

In the construction of baking ovens designed to operate at high capacity it is the usual practice to provide an oven structure of sufficient length to insure that when bakery goods are passed from the entry to the discharge ends thereof the goods will be properly baked due to accurate control of the transit period of the bakery goods through the oven. In accomplishing this purpose large capacity ovens are designed with a continuous conveyor structure upon which the loading pans carrying bakery goods receive the bakery goods directly or in individual baking pans, in any event making it possible to feed a plurality of bakery units into the oven on each loading. In view of the fact that the endless conveyor acts as a traveling hearth it is desirable to maintain the endless conveyor structure entirely within the oven so that a uniform temperature may be established. This makes it necessary to feed the loading pans into the entry end of the oven and onto the conveyors which are at a remote distance from the feed platform. It is common practice, therefore, to provide mechanical means which will engage one or more loading pans disposed laterally of the feed platform and transfer them from the loading platform onto the traveling conveyor. These devices for the most part have been intermittent in operation and have traversed a path of travel entirely above the feed platform. The result of this operation has been to retard the feeding operation since it is not possible to place loading trays upon the feed platform during the time a feed member is being retracted to its initial feeding position. Not only does the operation of such a structure limit the capacity of the oven but makes the feeding of the oven hazardous to the bakers. It is the principal object of the present invention, therefore, to provide an oven of the continuous traveling hearth type, one end of which operates adjacent to a feed platform, and in connection therewith a continuously operating loading mechanism whereby the trays may be advanced into the oven and onto the traveling hearth, and the advancing member moves to its initial loading position along a path of travel beneath the loading platform, making it possible for the bakers to place another set of loading trays upon the platform during the period of time required for retraction of the loading means.

It is another object of the present invention to provide an oven loading structure of the type described in which a desired selected synchronous drive may be established between the traveling hearth and the loading mechanism, thus making it possible to feed the bakery goods through the oven at a selected rate of speed and to place the loading trays on the traveling hearth in predetermined time intervals with relation to the linear speed of travel of the conveyor.

The present invention contemplates the construction of an oven having a traveling hearth therein receiving bakery goods from a feed platform and in connection with which platform and traveling hearth loading means operate to pass over the surface of the feed platform on its advance stroke of travel and to pass beneath the feed platform on its return stroke of travel, said traveling hearth and loading structures being connected to provide any desired synchronous feed movement between them.

The invention is illustrated by way of example in the accompanying drawings in which:

Figure 1 is a view in side elevation drawn at a reduced scale to illustrate a bakery oven with which the present invention is concerned.

Fig. 2 is an enlarged view in horizontal section and elevation as seen on the line 2—2 of Fig. 1 and shows the traveling hearth, the feed platform, the loading mechanism, and the variable speed platform.

Figure 3:
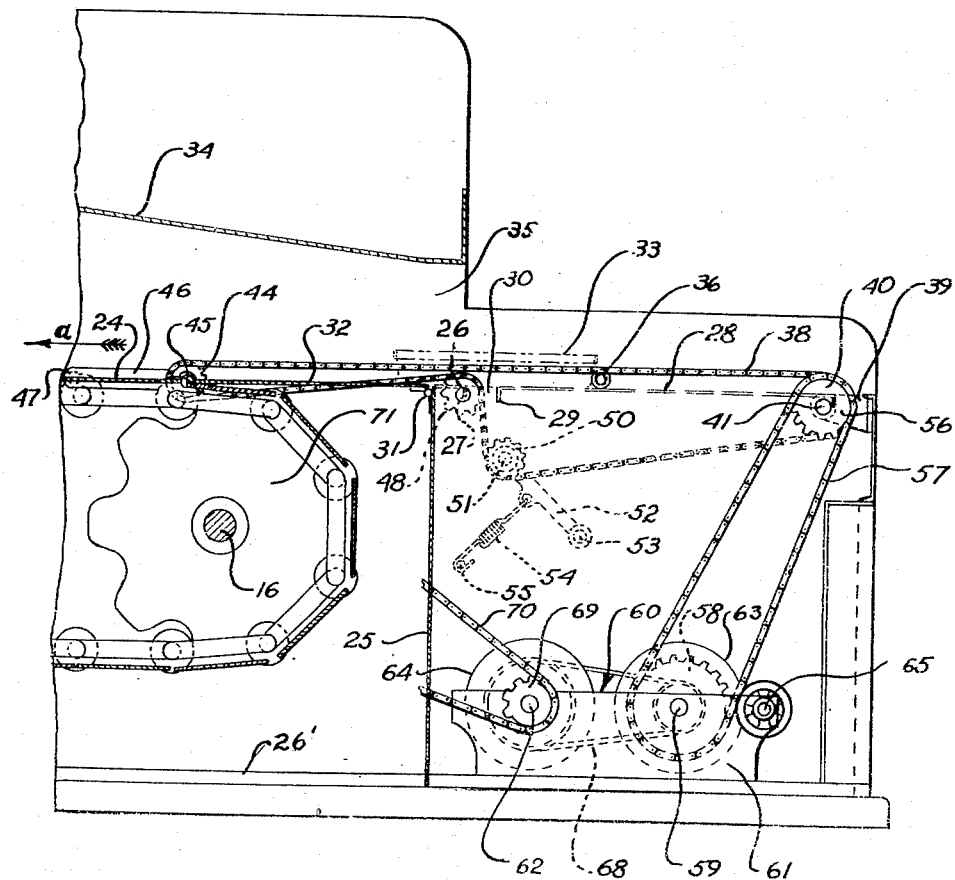
Fig. 3 is an enlarged fragmentary view as seen on the line 3—3 of Fig. 2 and shows other details of the conveyor and loading structure.

Referring more particularly to the drawing, 10 indicates a bakery oven having an entry feed platform 11 and a discharge platform 12. Intermediate these platforms is an articulate traveling hearth 13 which is led around conveyor sprockets 14 and 15. It is to be understood that suitable heating elements not shown in the drawing are arranged along and beneath the upper run of the traveling hearth 13 to heat the same. By reference to Fig. 2 of the drawing it will be seen that the conveyor sprockets 14 are mounted in spaced relation to each other upon a sprocket shaft 16. This shaft extends transversely of the oven and passes through the opposite oven side walls 17 and 18. The shaft is rotatably supported in bearings 19 and 20 disposed upon the outside of the walls 17 and 18 and enclosed by the walls 21 and 22 of an oven shell. The sprockets 14 receive conveyor chains 23 which are spaced with relation to each other and are disposed adjacent to the side walls 17 and 18. These conveyor chains carry hearth plates 24 so arranged as to be articulately connected by the conveyor chains so that the plates in the upper run of chain will produce a substantially continuous oven floor beneath which heat is applied.

By reference to Fig. 2 and Figure 3 it will be seen that the central portion of the oven structure is broken away for the sake of convenience. The width of the hearth plates may be selected as desired although it is usually determined by the baking capacity for which the oven is designed. Disposed transversely of the oven between the side walls 17 and 18 is a partition wall 25. This wall combines with the floor 26' to form a heat chamber within which the traveling hearth moves. Extending horizontally and outwardly from the upper edge of the end wall 25 is a feed plate section 26. This section has a down-turned flange 27. In the same plane with the feed plate section 26 is a major feed plate section 28 which has a down-turned flange 29 spaced horizontally from the flange 27 so that a transverse throat 30 will be formed across the loading platform formed by the two feed plates 26 and 28. The purpose of this throat will be hereinafter described. Articulately connected to the end wall 25 of the oven by a suitable hinge structure 31 is a vertically swinging hearth plate 32 which overlaps the traveling hearth so that loading pans 33 may be moved from the feed platform 28 and onto the plates 24 of the traveling hearth and for the additional purpose of preventing heat loss at the end of the oven. The oven space as defined by the side walls 17 and 18 and the end partition walls 25 and 25' is covered by a top wall 34 which as shown in Fig. 3 of the drawing inclines downwardly to a point above the feed plate 26 and thus combines therewith to form a restricted entry throat 35 through which the loading pans may be fed.

One of the principal features of the present invention is concerned with the loading pan feed or loading mechanism. This feed or loading mechanism acts to move the loaidng pans 33 from a place of rest on the loading platform, comprising plates 26 and 28 and the hinged hearth plate 32, onto the traveling hearth plates 24. This mechanism comprises a feed or loading bar 36 which is here shown as being cylindrical and as lying flat above the loading platform and transversely thereof. The opposite ends of the feed bar 36 are provided with threaded couplings 37 which connect to opposite parallel feed chains 38. These feed chains have an upper straight feed run above and parallel to the plates 26 and 28 and a return run beneath the feed plate 28 through the throat 30 at the inner end of the plate 28 and through a throat 39 at the outer edge of the plate 28. The feed chains are led around sprockets 40 disposed at opposite ends of a horizontal shaft 41. The shaft is supported rotatably in bearings 42 carried upon the end wall 43 of the outer shell of the oven.

Within the oven and at a point beyond the vertical plane of the axis of sprocket shaft 16 are sprockets 44. These sprockets are of smaller diameter than the sprockets 40 but are so disposed as to insure that the upper runs of the feed chains 38 will be horizontal and tangent to both sprockets under normal conditions. The sprockets 44 are mounted upon pins 45. These pins are carried at the free ends of oscillating links 46 which are disposed at opposite sides of the traveling hearth and are pivotally mounted upon pins 47 carried by the side walls 17 and 18 of the oven. Attention is called to the fact that the free edge of the horizontal hearth plate extends beyond the horizontal axis of the pins 45 in the construction illustrated. When the feed bar 36 reaches the extreme forward end of its travel it will be above the articulate hearth plate 32 and will return on this plate. In view of the fact that the feed bar 36 will pass around the sprockets 44 it is necessary for the sprockets 44 to move upwardly to minimize the offset of the feed or loading bar 36 shown in the drawings. This movement is accommodated by the oscillating links 46, as will be hereinafter explained. Adjacent to the lip 27 of the feed plate 26 are idler sprockets 48. These idler sprockets are carried upon pins 49 secured to the side walls 17 and 18 of the oven. The pitch circumference of the idler sprockets is substantially coincident with a median center line of the throat 30 in the loading platform so that as the feed chains 38 pass around the idler sprockets 48 they will carry the feed bar 36 downwardly. Disposed beneath the loading platform at opposite sides thereof is a second pair of idler sprockets 50. These sprockets are mounted upon pivot pins 51 carried at the free ends of tension arms 52. The opposite ends of the tension arms are mounted upon pivot pins 53 which project from the oven side walls 17 and 18. It is intended that the return run of the conveyor chain will pass beneath the idler sprockets 50 as they travel to the sprockets 40 and that these sprockets will maintain yieldable tension in the chains 38 as occasioned by the vertical movement of the sprockets 44 on the oscillating links 46. This yieldable tension is provided by tension springs 54 which connect to the tension arms 52 intermediate their ends and are fastened to pins 55 carried on the side walls 17 and 18 of the oven.

It will be understood that the various sprockets around which the chains 38 are trained serve as a means for guiding the feed or loading bar 36 along the loading and return legs of its path in sequence. The chains themselves, which are adapted to be driven by the sprockets 40, for example, serve as a means for moving the loading bar along such path.

It is obvious that the feeding mechanism previously described shall operate in synchronism with the traveling hearth so that bakery goods will be placed on the hearth in a desired spaced relation to each other irrespective of the lineal speed of travel at which the hearth is set to be driven. In order to accomplish these results in timing a selective variable speed drive is provided. One form of this drive is indicated in Figs. 1 to 3 of the drawings. Here it will be seen that the sprocket shaft 41 is fitted with a driving sprocket 56. The driving sprocket 56 receives a drive chain 57 which leads around a sprocket wheel 58. The sprocket wheel 58 is mounted upon a shaft 59 which forms a part of a variable speed drive generally indicated at 60. This drive is commonly known to the trade as the Reeves variable speed unit. The unit essentially comprises a base structure 61 within which the shaft 59 and a parallel shaft 62 are rotatably supported. Mounted within the base 61 are complementary cone-shaped pulley units 63 and 64. The units 63 are splined upon the shaft 59 and the units 64 are splined upon the shaft 62. An adjusting member 65 actuates lever arms 66 which are pivoted intermediate their ends upon pivot pins 67. It will be obvious that when the free ends of the arms 66 are drawn together by the adjusting member 65 on one side of the pivots 67 the free ends of the levers at the opposite sides of the pivots 67 will spread apart. This movement of the levers will cause the complementary cone-shaped pulley of each of the units 63 and 64 to move simultaneously, the pulleys of one unit moving toward each other and the pulleys of the other unit moving away from each other. A belt 68 of V-shaped cross section embraces the cone-shaped pulleys of each of these units so that the effective diameter of one unit will be increased as its pulleys are forced toward each other and the belt is moved outwardly and the effective diameter of the other unit will be decreased as the pulleys are separated and the belt moves toward the axis of the unit.

The shaft 62 carries a sprocket 69 which receives a sprocket chain 70. This chain leads around a sprocket 71 on the hearth conveyor shaft 16. As shown in Fig. 1 of the drawing a hearth conveyor is driven by power applied to conveyor shaft 16 at the discharge end of the oven. By this particular arrangement the spacing of the loading pans 33 may be controlled accurately as the traveling hearth moves.

It is obvious that in the use of the structure shown in Figs. 1 to 3, inclusive, the length of loading pans 33 might vary, in which case it would be desirable to change the loading period with relation to the travel of the conveyor. For accomplishing this purpose the variable speed unit 60 has been provided so that the loading mechanism will function in a desired synchronous movement with relation to the hearth.

It is to be understood that in the form of the device shown in Figs. 1 to 3, inclusive, the traveling hearth structure 13 is driven by a motor, indicated in Fig. 1 at 15'. Such a motor is provided with a variable speed control so that the conveyor will pass through the oven at optimum rate of speed for proper baking of a particular kind of baking goods or to agree with the temperature within the oven. In this form of device the loading mechanism is also driven by the motor 15'. Thus the traveling hearth and the loading device will maintain a desired synchronous movement as established by adjustment of the variable speed unit 60.

Figure 4:
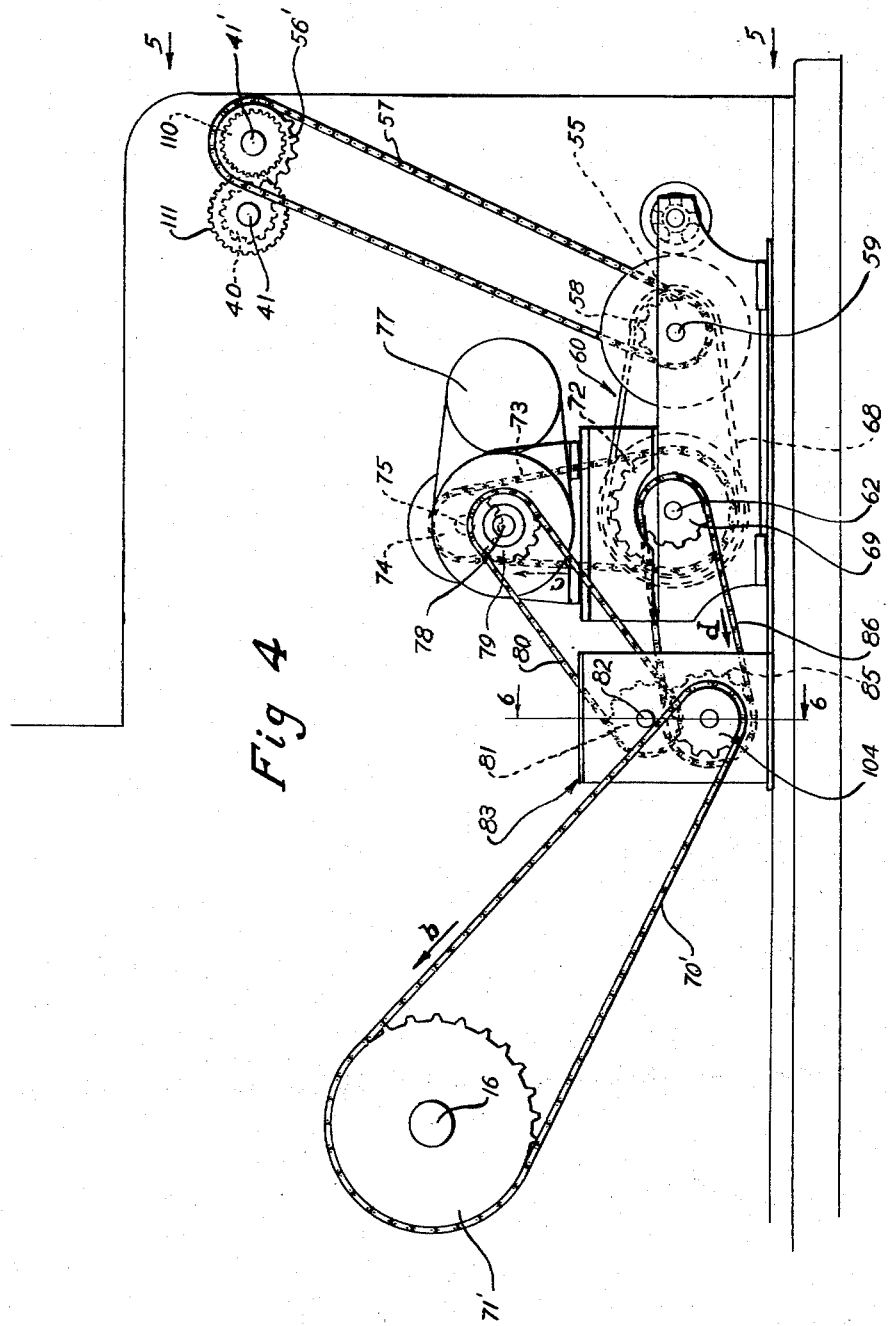
Fig. 4 is a view in side elevation showing the variable speed drive as disassociated from the loading mechanism.
Figure 5:
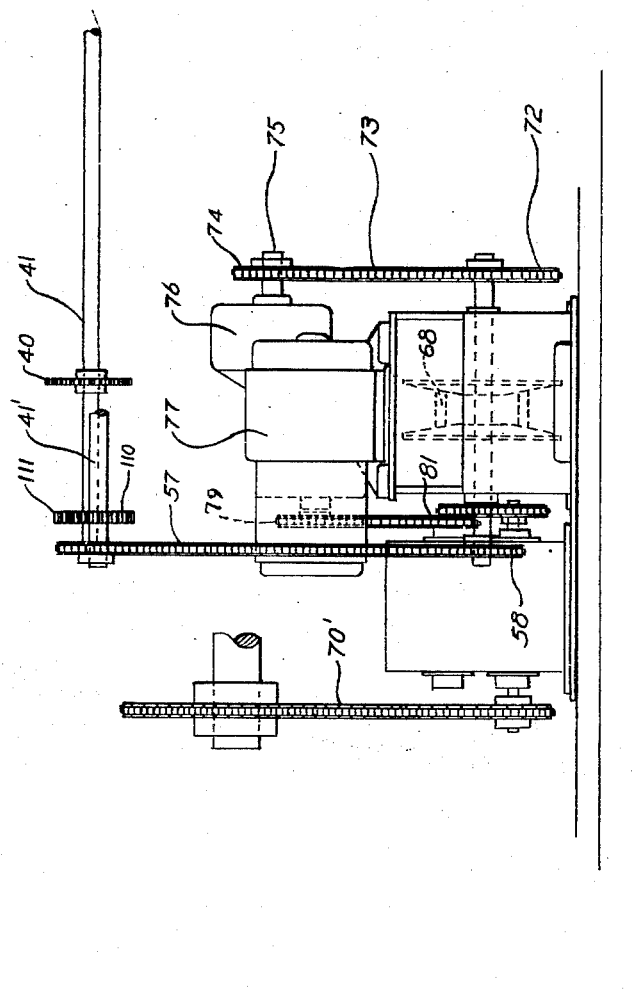
Fig. 5 is a view in end elevation showing the variable speed drive as seen on the line 5—5 of Fig. 4.
Figure 6:
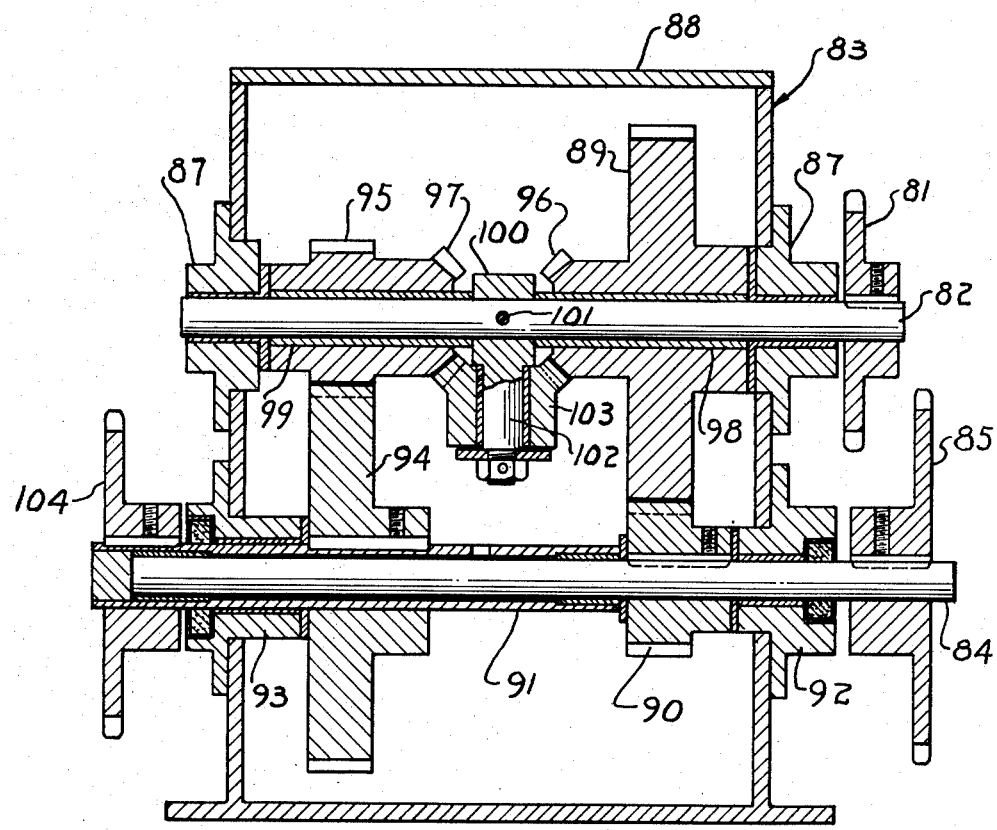
Fig. 6 is a view in transverse section through the differential gear structure of the variable speed drive as seen on the line 6—6 of Fig. 4.

In some bakery oven installations it is considered desirable to drive the traveling hearth by a variable speed motor, as indicated at 15', and to provide an independent continuous speed secondary motor drive for the loading device. In such an arrangement it is obvious that when a necessary variation in the driving speed of the traveling hearth 13 is made by varying the driving speed of the motor 15' the desired synchronous action between the traveling hearth 13 and the loading device will be disturbed. It is desirable therefore to provide means acting automatically to vary the operating speed of the loading device to restore the desired synchronous movement between the loading device and the traveling hearth. In Figs. 4 to 6 such a structure has been shown. Here it will be seen that the Reeves variable speed unit is employed, as generally indicated at 60. The shaft 62 of this unit is fitted with a sprocket 72 which receives a sprocket chain 73. This chain leads around a sprocket 74 on a shaft 75. The shaft 75 connects with the speed reduction unit 76, such as the unit commercially known as a "Sterling Speedtrol," which is associated with a secondary driving motor 77. The "Sterling Speedtrol" is a structure operating much on the same order as the Reeves drive previously described as containing pulley units 63 and 64. In the Sterling unit however an electric motor is provided which is in electric synchronism with the drive motor 16. The unit 76 compensates for changes in the driving speed of the conveyor and the unit 60 compensates for differences of the bread pans used in the ovens. The secondary drive motor 77 is of commercial construction and provides a drive for the loading mechanism. A shaft 78 is provided to operate variable speed mechanism associated with the motor 77 and forming a part of the unit 76. In the usual construction of this type of motor drive the member 78 is adjusted manually. In the present instance it is intended to adjust the member 78 and the variable speed mechanism associated therewith by a full automatic operation. Thus the member 78 carries a sprocket wheel 79 around which a sprocket chain 80 is led. The sprocket chain 80 also passes around a sprocket 81. This is mounted upon a shaft 82 of a differential unit 83. The details of construction of the differential unit are shown particularly in the enlarged sectional view Fig. 6 of the drawing. The shaft 82 is above and parallel to a shaft 84 within the unit 83. Mounted upon the end of the shaft 84 is a sprocket 85 which receives a sprocket chain 86, the other end of which is led around the sprocket 69 on the variable speed unit 60 previously described.

The shaft 82 is mounted within bearings 87 carried within the housing 88 of the differential unit 83. Mounted upon the shaft 82 and within the housing is a spur gear 89 which is in mesh with a spur gear pinion 90. The pinion 90 is keyed upon the shaft 84. Mounted upon the shaft 84 is a tubular shaft 91. A bearing 92 in the housing 88 supports the shaft 84, and a bearing 93 at the opposite end supports the shaft 84 as well as the tubular shaft 91 through which it telescopes. Keyed upon the tubular shaft 91 is a spur gear 94. This gear is in mesh with a pinion 95. The pinion 95 is free to rotate upon the shaft 82. This is also true of the spur gear 89. Secured at contiguous ends of the gears 89 and 95 are bevel gears 96 and 97, respectively. The gears 89 and 96 are rotatably mounted upon a bushing 98, and the gears 95 and 97 are rotatably mounted upon a bushing 99. Disposed between the contiguous ends of the bushings 98 and 99 is a collar 100. This collar is pinned to the shaft 82 at 101. The collar carries a radially extending shaft 102 upon which a bevel gear 103 is free to rotate. This gear meshes simultaneously with the bevel gears 96 and 97. It will be noted that the spur gears 89 and 94 and their pinions 90 and 95 provide a suitable gear reduction within a relatively small space.

Mounted upon the outer end of the tubular shaft 91 and keyed thereto is a sprocket 104. The sprocket 104 receives a sprocket chain 70' which is led around a sprocket wheel 71' carried by the traveling hearth conveyor shaft 16. It will be understood that the conveyor hearth is driven by power applied to either of the shafts 16 from an independent power unit.

It is to be noted that the motor 77 drives the shaft 62 of the variable speed unit 60 through a sprocket 74 on the motor shaft 75, a sprocket 72 on the shaft 62 and a chain 73. It is also to be understood that the shaft 62 will act through the sprocket 69 and the sprocket chain 86 to drive the sprocket 85 which is on the shaft 84 of the differential unit 83.

The direction of rotation of the shaft 84 is counter to the direction of rotation of the tubular shaft 91, which latter shaft is driven by the sprocket chain 70' from the sprocket 71' on the conveyor shaft 16. This makes it necessary to provide means for reversing the direction of rotation of the loading structure drive shaft 41. This is accomplished by providing a secondary drive shaft 41' upon which sprocket 56' is mounted. The sprocket chain 57 leads from sprocket wheel 58 of the variable speed unit 60 to the sprocket 56'. A pair of reversing gears 110 and 111 are mounted upon the shafts 41' and 41, respectively, and mesh to place the loading mechanism in proper driving direction.

In explaining the operation of the present invention the form of structure shown in Figs. 1, 2 and 3 will be discussed first. In this structure the traveling hearth comprising the conveyor chains 23 and the intermediate hearth plates 24 moves in the direction of the arrow a. This hearth will then receive loading trays 33 at the loading platform 11 and will discharge the loading trays onto the platform 12 at the opposite end of the oven structure 10. When the mechanism is started adjustment of the adjusting structure 65 of the variable speed unit 60 is made to cause the feed bar 36 to advance the loading pans 23 onto the plates 24 of the traveling hearth in a proper spaced relation to each other and thus in a predetermined time sequence. During the time interval required by the feed bar 36 to pass around the sprockets 44 and return to the throat 30 and to thereafter pass beneath the feed plate 28 to the sprockets 40 the loading platform comprising the feed plates 26 and 28 will be clear and it will be possible to place a row of loading pans 33 on the plate 28 preparatory to a loading operation. After the loading bar 36 has passed around the sprockets 40 it will then move forwardly over the surface of the feed plates 28 and 26, and when it encounters the loading pans 33 will move them forwardly while resting successively on the feed plates 28 and 26 and the hearth plate 32. When the feed bar 36 reaches the free edge of the hearth plate 32 it will have moved the loading pans 33 substantially onto the plates 24 of the traveling hearth and the hearth will carry the loading pans forwardly into the oven. At the conclusion of the travel of the feed bar 36 into the oven this bar will still remain on top of the articulate hearth plate 32, with the result that as the bar and the section of the chain with which it is directly connected passes around the sprockets 44 these sprockets will be compelled to rise and swing upwardly as carried by the links 46. As this rise takes place the conveyor chain 38 will be placed under tension due to the arcuate travel of the sprockets 44 around the pivots 47 of the links 46. This tension is accommodated by the arms 52 and the idler sprockets 50 which will tend to swing and stretch tension springs 54. The feed bar 36 will therefore travel rearwardly while resting upon the upper face of the articulate hearth plate 32 and then upon the narrow feed plate 26. The feed bar 36 will then pass downwardly through the throat 30 and around the idler sprockets 50 to the drive sprockets 40. It will thus be seen that during the entire return travel of the feed bar 36 the feed bar will not be in an obstructing position above the loading platform. This will conserve all of the time now required for the feed bars to travel rearwardly over and above the loading platform, and will also make a structure which will insure that workmen cannot be injured by the rearwardly moving feed bar 36.

As previously explained, in the event that loading trays 33 of various lengths are used it is possible to operate the adjusting means 65 of the variable speed unit 60 and change the synchronous driving action of the feed chains 38 with relation to the chains 23 of the traveling hearth structure. This adjustment is a manual operation and takes place in both forms of the invention.

As previously described, some baking ovens have a motor for driving the traveling hearth and a separate motor for driving a loading mechanism. It is obvious that while the two motors operate at a constant predetermined rate of speed the traveling hearth and the loading mechanism will move in synchronism, However, variation in temperature conditions within the oven or required baking time for different bakery products make it necessary to vary the speed of travel of the traveling hearth. This is done in the present invention by varying the driving speed of the conveyor motor 15'. At such a time the driving speed of the loading mechanism motor 77 will remain constant. It is obvious that this will throw the machine out of synchronism. The differential unit 83 shown particularly in Fig. 6 of the drawing is provided to restore proper synchronous movement of the traveling hearth and the loading mechanism by an automatic action. This operation is brought about in the following manner: The sprocket 71' upon the conveyor shaft 16 is driven in the direction of the arrow b, as indicated in Fig. 4 of the drawing. This sprocket derives its driving force from the variable speed motor 15'. As the sprocket chain 70' provides a driving connection between the sprocket 71' and the sprocket wheel 104 of the differential drive unit rotation of the tubular shaft 91 will take place in a direction corresponding to the arrow b. At this same time the motor 77 acts through sprockets 72 and 74 and the sprocket chain 73 to drive the shaft 62 of the variable speed unit 60 in the direction of the arrow c. The shaft 62 will thus drive the sprocket 69 and the sprocket chain 86 so that the sprocket wheel 85 will rotate in the direction of the arrow d. The sprocket wheel 85 is mounted upon the shaft 84, and thus the shafts 84 and 91 will rotate in counter directions at all times. This will act through the gear trains to rotate the gears 96 and 97 in counter directions, it being understood that the gearing has been designed so that the normal speeds of rotation of the gears 96 and 97 are equal. During this time the gears 96 and 97 will cause the intermediate bevel gear 103 to rotate constantly on the axis of the shaft 102. At this time the shaft 82 will stand idle and the speed reduction unit 76 will remain in its predetermined normal set position. If, however, the variable speed motor 15' is controlled so that its speed either accelerates or decelerates it is obvious that the equality in driving torque between the bevel gears 96 and 97 will be changed since the bevel gear 96 is being driven by the motor 77 at a constant speed. When such a change takes place a force will be set up through the gear 103 to cause the gear 103, its shaft 102 and the collar 100 to rotate around the axis of the shaft 82. The magnitude of this rotation will be in direct relation to a desired movement of the shaft 78 on the speed changing unit 76 associated with the motor 77. Thus the rotation of the shaft 78 will readjust the speed ratio in the variable speed unit 76 and restore proper synchronous movement between the traveling hearth 13 and the loading mechanism. As soon as this movement is restored the gears 96 and 97 will of course assume their normal equal speed relationship and the shaft 82 will be held against rotation. It is of course evident that some installations might be made in which the variable speed unit 60 is eliminated and the drive of the secondary motor 77 leads directly to the loading mechanism.

It is obvious that while the present invention has been described for use with a traveling hearth of the endless conveyor type, it is also possible to use the loading device with a rotary hearth or a hearth moving vertically and having trays or carriers which move to register with the loading platform and in synchronism with the loading mechanism.

It will thus be seen that the invention here disclosed provides a simple loading mechanism which may be used in various installations to move material from a loading platform while traveling over the platform and to return to its initial feed position beneath the platform, whereby the platform will be unobstructed during the return movement, thus allowing materials to be deposited upon the loading platform during this interval. It will also be evident that the present invention provides simple means for establishing a desired ratio between the speed of travel of the traveling hearth and the loading mechanism and to maintain automatically said established ratio irrespective of change in speed ratio which may take place between the conveyor power unit and the loading mechanism power unit.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. An oven loading device comprising: a loading platform at the entry end of an oven and in the substantially horizontal plane of the upper run of a traveling hearth, said platform being formed adjacent to its forward edge with a transverse slot, an articulate hearth plate hinged to the forward edge of the loading platform with its free edge extending into the oven and resting upon the traveling hearth whereby the gap between the loading platform and the traveling hearth will be bridged, a feed bar adapted to move forwardly into the oven and across the loading platform and a portion of said hearth plate, and driving means supporting said feed bar and moving it in a cycle of travel whereby during the feed period of said cycle the feed bar will travel over the loading platform and the articulate hearth plate and on the return period of said cycle it will travel over the articulate hearth plate, then through the slotted opening in the loading platform and will complete the cycle along a path of travel beneath the loading platform.

2. An oven loading device including a loading platform upon which bakery goods may be deposited and over which they may be moved onto a traveling conveyor, said loading platform being interrupted adjacent its forward edge to provide a transverse opening, a continuously moving feed bar adapted to traverse the top of said loading platform while moving bakery goods across the loading platform and onto the traveling conveyor and adapted to return to its initial feed position by initially passing over the loading platform to the transverse opening and then passing downwardly through the opening in the loading platform and than returning along a path of travel beneath the loading platform, and continuous driving means therefor.

3. A loading device comprising a loading platform upon one end of which an article is deposited and from the opposite end of which the article is discharged after having been moved across the platform, said platform having a transverse opening through it between its entry end and its discharge end, a feed bar designed to travel across the loading platform from its loading end to a point near its discharge end and thereabove, endless conveying members at opposite sides of the platform by which the feed bar is carried, driving means fixed adjacent to the entry end of the platform and around which said endless conveyor is passed, a floating member at the opposite end of the path of the feed bar and around which the endless conveyor passes, mounting means for said floating member permitting the member to swing vertically to accommodate the feed bar as it passes around said member and moves along the discharge end of the loading platform on its return travel, and guide means for directing said endless conveyor downwardly through the transverse opening in the loading platform whereby the feed bar will pass through the platform and will return to its initial position along a path of travel beneath the platform.

4. An oven loading device comprising a platform, a feed bar adapted to be moved in opposite directions over the platform along paths substantially parallel to the platform to propel articles along said platform, a pair of endless chains engaging the opposite ends of the feed bar to move the same along said paths, and sprocket wheels disposed adjacent said platform over which said chains are guided and means mounting the sprocket wheels and platform for relative bodily movement substantially normal to said platform, whereby the bar may rest on the platform in its travel in both directions with respect thereto.

5. The structure as set forth in claim 4 in which the platform includes a relatively stationary portion and a portion articulated with respect to the relatively stationary portion.

6. The structure as set forth in claim 4 in which the platform is provided with a throat through which the chain and bar may pass so as to permit a portion of the return travel of the bar to be beneath a portion of the platform.

7. In an apparatus for use adjacent the inlet end of an oven provided with an endless travelling hearth having upper and lower runs to load baking pans containing bakery goods to be baked onto the upper run of the travelling hearth, the combination of: a generally horizontal loading platform having inlet and outlet ends and adapted to be positioned substantially on a level with the upper run of the travelling hearth with said outlet end thereof adjacent the travelling hearth, said loading platform being adapted to have placed thereon baking pans to be loaded onto said travelling hearth; loading means extending transversely of said loading platform; means for guiding said loading means along a closed path which includes a loading leg above said loading platform and extending toward said outlet end thereof, which includes an initial return leg above said loading platform and extending toward said inlet end thereof, and which includes a final return leg below said loading platform and extending toward said inlet end thereof, said final return leg of said closed path being a continuation of said initial return leg thereof, said loading platform being provided with a transverse throat intermediate said inlet and outlet ends thereof and through which said loading means is adapted to pass, said initial return leg of said closed path extending between said outlet end of said loading platform and said throat and said final return leg thereof extending between said throat and said inlet end of said loading platform; and drive means for moving said loading means along said loading leg, said initial return leg, and said final return leg of said closed path sequentially, whereby said loading means loads any baking pans on said loading platform onto the travelling hearth during movement of said loading means along said loading leg of said closed path.

8. In an oven loading apparatus, the combination of: loading means; means for guiding said loading means around an elongated, closed path having inlet and outlet ends, said closed path having a generally horizontal, loading leg which extends between points adjacent said inlet and outlet ends thereof, having an initial return leg, and having a final return leg at a level below that of said loading leg and that of said initial return leg, said initial return leg of said closed path being a continuation of said loading leg thereof and extending between a point adjacent said outlet end of said closed path and a zone intermediate said inlet and outlet ends thereof, and said final return leg of said closed path being a continuation of said initial return leg thereof and extending between said zone and a point adjacent said inlet end of said closed path, said loading leg of said closed path being, in turn, a continuation of said final return leg thereof; a generally horizontal loading platform at a level below that of said loading leg and that of said initial return leg of said closed path, but above that of said final return leg thereof, said loading platform having inlet and outlet ends respectively adjacent said inlet and outlet ends of said closed path, said loading platform providing a passage in said zone through which said loading means passes in moving from said initial return leg of said closed path onto said final return leg thereof; and drive means for moving said loading means along said loading leg, said initial return leg and said final return leg of said closed loop in sequence.

9. In an oven loading apparatus, the combination of: a generally horizontal loading platform having inlet and outlet ends and having a transverse throat therethrough intermediate said inlet and outlet ends thereof; a pair of endless conveying elements respectively disposed along opposite sides of said loading platform, each of said conveying elements having a generally horizontal loading run which is at a level above that of said loading platform and which extends between points adjacent said inlet and outlet ends of said loading platform, having an initial return run which extends between points adjacent said outlet end of said loading platform and said throat, having a downwardly extending run which is substantially aligned with said throat, and having a final return run which is at a level below that of said loading platform and which extends between points adjacent said throat and said inlet end of said loading platform, said initial return run of each of said conveying elements being a continuation of said loading run thereof, said downwardly extending run of each of said conveying elements being a continuation of said initial return run thereof, said final return run of each of said conveying elements being a continuation of said downwardly extending run thereof, and said loading run of each of said conveying elements being a continuation of said final return run thereof; means for supporting said runs of said endless conveying elements, including a plurality of rotatable elements over which said conveying elements are tra ed; a loading bar extending transversely of said loading platform and connected at its ends to said conveying elements, respectively, said loading bar being movable above said loading platform from said inlet end thereof to said outlet end thereof during movement of said conveying elements along said loading runs thereof, being movable above said loading platform from said outlet end thereof to said throat during movement of said conveying elements along said initial return runs thereof, being movable downwardly through said throat during movement of said conveying elements along said downwardly extending runs thereof, and being movable below said loading platform from said throat to said inlet end of said loading platform during movement of said conveying elements along said final return runs thereof; and means for driving said conveying elements.

10. An oven loading apparatus according to claim 9 wherein said loading bar is offset inwardly of the paths defined by said endless conveying elements.

11. An oven loading apparatus according to claim 9 wherein said loading platform includes a stationary section adjacent said inlet end thereof and in which said transverse throat is formed, and includes a movable section adjacent said outlet end thereof and movably connected to said stationary section.

12. In an oven loading apparatus, the combination of: a generally horizontal loading platform having inlet and outlet ends and having a transverse throat therethrough between said inlet and outlet ends thereof; guide means providing a loading path above said loading platform and extending toward said outlet end thereof, a first return path above said loading platform which extends toward said inlet end thereof and which terminates adjacent said throat, and a second return path which extends downwardly through said throat and which extends toward said inlet end of said loading platform below said loading platform; loading means extending transversely of said loading platform and operatively connected to said guide means so as to move along said paths; and means for moving said loading means along said paths.

HIRAM E. TEMPLE.

REFERENCES CITED

The following references are of record in the file of this patent:

UNITED STATES PATENTS

| Number | Name | Date |
|---|---|---|
| 1,141,601 | Baker | Jan. 1, 1915 |
| 1,321,531 | Manierre | Nov. 11, 1919 |
| 1,718,861 | Hath | June 25, 1929 |
| 1,764,550 | Comstock | June 17, 1930 |
| 1,769,201 | Brandeen et al. | July 1, 1930 |
| 1,795,352 | Sundbom | Mar. 10, 1931 |
| 1,815,555 | Feigh | July 21, 1931 |
| 1,858,167 | Naylor | May 10, 1932 |
| 1,885,935 | McAllister | Nov. 1, 1932 |
| 1,906,831 | Baker et al. | May 2, 1933 |
| 2,062,136 | Marresford | Nov. 24, 1936 |
| 2,202,399 | Riesen | May 28, 1940 |